United States Patent [19]

Freeman

[11] 3,937,584
[45] Feb. 10, 1976

[54] APPARATUS FOR SECURING AN ELONGATED HANDLE TO THE BACK OF A BRUSH OR THE LIKE

[76] Inventor: Elven O. Freeman, 5824 N. Harvard Drive, Oklahoma City, Okla. 73122

[22] Filed: Mar. 7, 1975

[21] Appl. No.: 556,559

[52] U.S. Cl. .................................. 403/256; 15/146
[51] Int. Cl.² ........................................... B25G 3/24
[58] Field of Search ..................... 403/256; 15/146

[56] References Cited
UNITED STATES PATENTS

| | | | |
|---|---|---|---|
| 1,906,902 | 5/1933 | Firestone et al. | 403/256 |
| 3,629,894 | 12/1971 | Stefany | 15/146 |

Primary Examiner—Andrew V. Kundrat
Attorney, Agent, or Firm—Laney, Dougherty, Hessin & Fish

[57] ABSTRACT

Apparatus for securing one end of an elongated handle to the back of a brush or the like including an elongated handle securing member having opposite ends with one end secured to one end of the elongated handle and the opposite end having an oblique end face formed thereon. a symmetrical U-shaped brush engaging member is journaled at its medial portion to the handle securing member with hooks formed on the opposite ends thereof for engaging the bottom and one side of the back of the brush. A rigid hook member having opposite ends has a hook formed on the one end thereof for engaging the bottom and the opposite side of the back of the brush with the opposite end having external threads formed thereon and extending through the handle securing member where it is threadedly engaged by an internally threaded wing nut for drawing the back of the brush into secure engagement with the oblique end face of the handle securing member.

7 Claims, 4 Drawing Figures

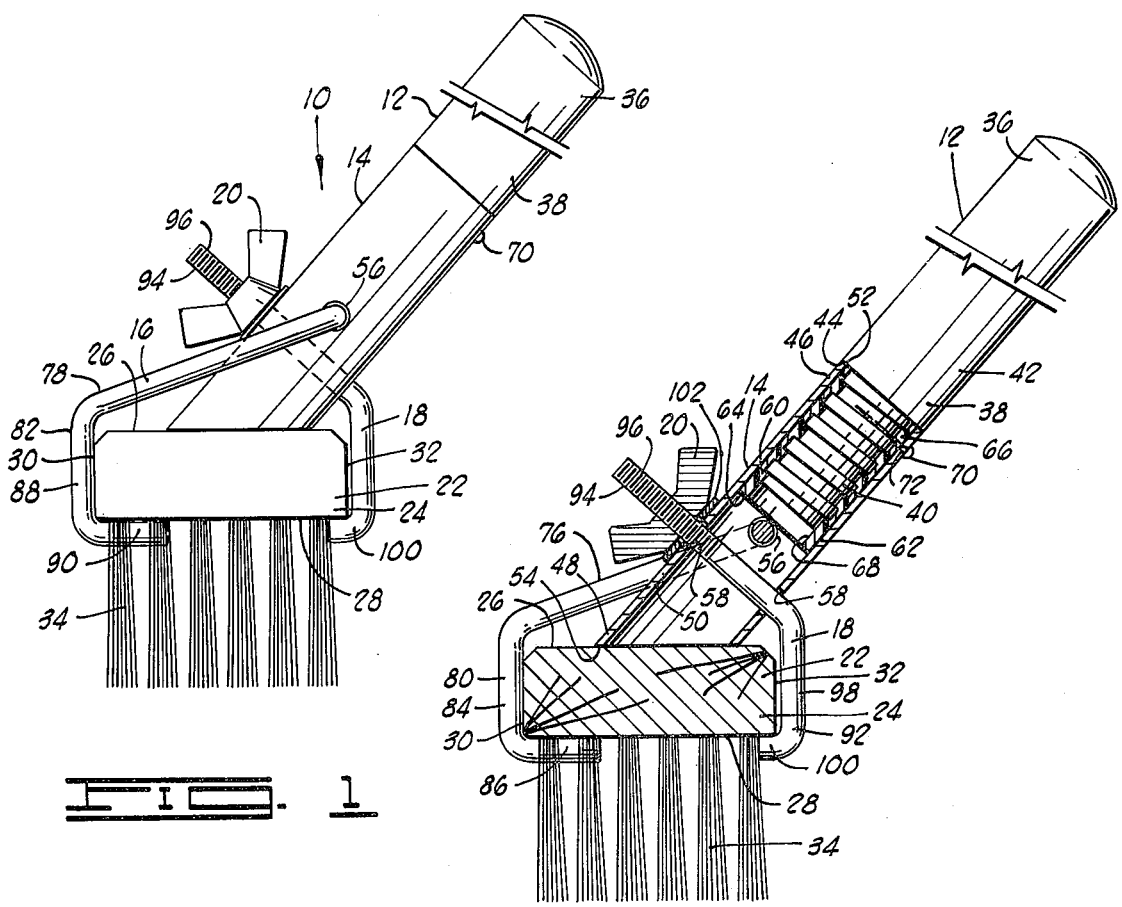
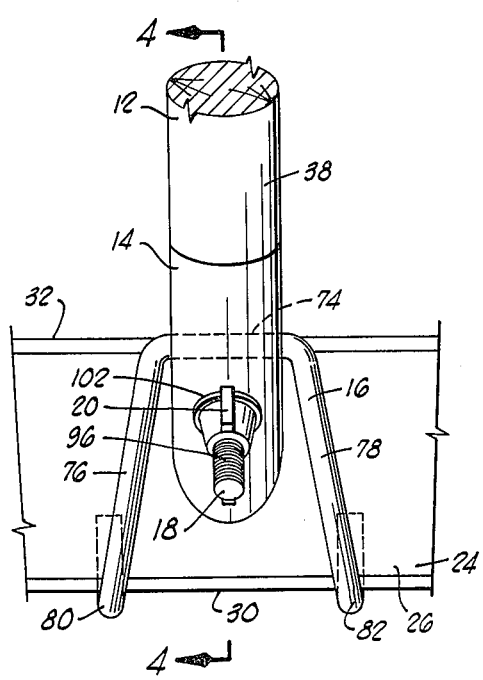
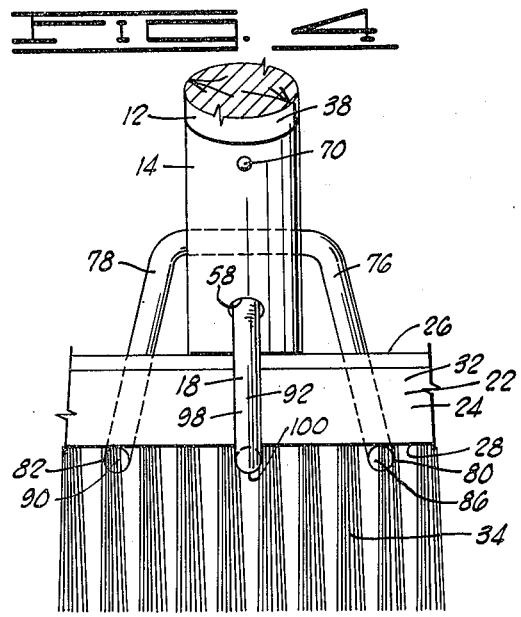

APPARATUS FOR SECURING AN ELONGATED HANDLE TO THE BACK OF A BRUSH OR THE LIKE

BACKGROUND OF THE INVENTION

1. Field of the Invention

The invention relates generally to improvements in apparatus for connecting two elements together and more particularly, but not by way of limitation, to improvements in apparatus for connecting handles to brushes or the like.

2. Description of the Prior Art

The prior art contains a number of teachings of elongated handles having externally threaded end portions which may be threadedly secured to the backs of brushes or brooms having material internal threads integrally formed in or permanently secured to the backs of the brushes. In order for various brush heads to be interchanged with the same handle, each brush head must have the identical internal threads formed therein for engagement with the external threads of the handle.

In certain cleaning operations, more specifically, certain industrial cleaning operations, it is necessary to utilize brushes having extremely stiff bristles, such as steel wire bristles, in an acid environment to clean various floor and wall surfaces prior to the application of certain synthetic industrial flooring or coatings. The use of such brushes in such a hostile environment causes extremely short service life of the brushes thus necessitating frequent replacement of the brushes.

It has, therefore, become important to utilize brushes having as low a first cost as possible in the industrial cleaning operations. A most desirable brush for this application has a back with a flat top and flat bottom from which the bristles extend, and with opposite parallel sides extending from the top to the bottom. The present invention provides reliable and secure means for securing a conventional, externally threaded broom or brush handle to the flat back of such relatively inexpensive brushes as are suitable for the above-discussed industrial cleaning operation and to other forms of brushes, brooms, scrapers and mops.

SUMMARY OF THE INVENTION

The present invention contemplates an apparatus for securing one end of a handle to the back of a brush or the like having opposite sides. The apparatus includes a tubular member having a first end and a second end with a first end face on the first end and with a second end face on the second end lying in a plane oblique to the longitudinal axis of the tubular member. A first pair of aligned apertures are formed in the tubular member and are aligned along a line normal to the longitudinal axis of the tubular member and lying in a plane parallel to the plane of the second end face. A second pair of aligned apertures are formed in the tubular member intermediate the first pair of aligned apertures and the second end face and are aligned along a line normal to the longitudinal axis of the tubular member.

A U-shaped member is journaled at the medial portion thereof in the first pair of apertures in the tubular member and includes hook means formed on each of the ends of the U-shaped member for engaging one side of the back of a brush.

A hook member is included having a first end and a second end with hook means formed on the first end for engaging the opposite side of the back of the brush and with external threads formed on the second end with the second end of the hook member extending through the second pair of aligned apertures.

The apparatus further includes internally threaded nut means for threadedly engaging the external threads of the second end of the hook member for drawing the hook means of the hook member and the hook means of the U-shaped member into secure engagement with the back of the brush to securely mutually engage the second end face of the tubular member with the back of the brush, and means for fixedly securing one end of the handle to the first end of the tubular member.

An object of the invention is to provide efficient means for securing one end of an elongated handle to the back of a brush or the like.

Another object of the invention is to provide apparatus for rigidly securing one end of an elongated handle to the back of a brush of conventional configuration having no integral means for mutual engagement with a handle.

A further object of the invention is to provide apparatus for securing an elongated handle to a conventional brush or the like which provides for the convenient installation and removal of brushes from the handle.

A still further object of the invention is to provide apparatus for securing an elogated handle to the back of the brush or the like which is economical in construction and simple in operation.

Other objects and advantages of the invention will be evident from the following detailed description when read in conjunction with the accompanying drawing.

BRIEF DESCRIPTION OF THE DRAWING

FIG. 1 is a side elevation view of the present invention interconnecting an elongated handle and the back of a brush.

FIG. 2 is a fragmentary top view of the apparatus shown in FIG. 1 with the outer ends of the brush taken away.

FIG. 3 is an elevation view of the apparatus of FIG. 1 as viewed from the right in FIG. 1 with the outer ends of the brush taken away.

FIG. 4 is a cross-sectional view taken along line 4-4 of FIG. 2.

DESCRIPTION OF THE PREFERRED EMBODIMENT

Referring now to the drawing, the apparatus of the present invention is generally designated by the reference character 10. The apparatus includes an elongated handle 12, an elongated handle securing member 14, a substantially U-shaped brush engaging member 16, a rigid hook member 18 and an internally threaded wing nut 20.

The apparatus 10 is illustrated secured to the back 22 of a brush 24 or the like. The back 22 includes a substantially flat top 26, a bottom 28 and opposite substantially parallel sides 30 and 32. The brush 24 includes a plurality of bristles 34 extending from the bottom 28 of the back 22. The bristles may be formed of lengths of steel wire, natural hairs, or lengths of synthetic fibers. It will be understood that the back 22 may, in the alternative, be secured to a sponge or mop element or a scraping element secured to the bottom 28 thereof. The apparatus 10 is equally applicable to such alternative structures.

The elongated handle 12 includes a first end 36 and a second end 38. An externally threaded portion 40 is formed on the second end 38 and communicates with the outer periphery 42 via an annular shoulder 44.

The elongated handle securing member 14 is preferably formed of a length of cylindrically shaped tubular member having a first end 46 and a second end 48 with a cylindrical inner periphery 50 extending between the first and second ends 46 and 48. A first end face 52 is formed on the first end 46 and lies in a plane substantially normal to the longitudinal axis of the elongated member 14. A second end face 54 is formed on the second end 48 and lies in a plane oblique to the longitudinal axis of the elongated member 14. The plane of the second end face 54 preferably intersects the longitudinal axis of the elongated member 14 at an angle of approximately 48°.

A first bore is formed in the elongated handle securing member 14 forming a first pair of aligned apertures 56 in the member 14 aligned along a line normal to the longitudinal axis of the elongated member 14 and also lying in a plane parallel to the plane of the second end face 54. A second bore is formed in the elongated handle securing member 14 intermediate the aligned apertures 56 and the second end face 54 of the elongated member 14 forming a second pair of aligned apertures 58 in the member 14. The second pair of apertures 58 are aligned along a line normal to the longitudinal axis of the elongated member 14.

A cylindrically shaped tubular length of resilient material 60, such as vinyl or other suitable resilient synthetic material, is disposed within the first end 46 of the elongated handle securing member 14 with the cylindrical outer periphery 62 thereof engaging the cylindrical inner periphery 50 of the member 14. The first end 64 of the tubular member 60 is disposed adjacent to, but not blocking, the aligned apertures 56 while the second end 66 of the member 60 is disposed adjacent to, but not extending beyond, the first end face 52 of the elongated member 14. The cylindrical inner periphery 68 of the resilient member 60 is of a diameter less than the major diameter and greater than the root diameter of the external threaded portion 40 of the elongated handle 12.

As shown in FIG. 4, the externally threaded portion 40 of the elongated handle 12 is threadedly received within the cylindrical inner periphery 68 of the resilient member 60 with the annular shoulder 44 of the handle 12 abutting the first end face 52 of the member 14. The cylindrical inner periphery 68 is deformed into matching internal threads by the externally threaded portion 40 as the elongated handle 12 is rotated relative to the elongated handle securing member 14 and resilient member 60. A small brad or nail 70 extends through an aperture 72 in the elongated handle securing member 14 and into the externally threaded portion 40 of the elongated handle 12 to prevent the handle 12 from being unthreaded from the member 14.

The U-shaped brush engaging member 16 is symmetrically shaped and is preferably formed of a length of relatively rigid metal rod of circular cross-section. The medial portion 74 of the member 16 extends through the apertures 56 to journally support the member 16 on the elongated handle securing member 14. A pair of identical legs 76 and 78 each extend from the medial portion 74 at an angle approaching a right angle. Hook structures 80 and 82 are formed, respectively, on the outer end portions of the legs 76 and 78. Hook structure 80 includes a downwardly extending segment 84 and an inwardly extending segment 86. Hook structure 82 includes a downwardly extending segment 88 and an inwardly extending segment 90. The downwardly extending segments 84 and 88 engage the side 30 of the back 22 of the brush 24 while the inwardly extending segments 86 and 90 engage the bottom 28 of the back 22 of the brush 24.

The rigid hook member 18 is preferably formed of a length of metal rod having a circular cross-section. The hook member 18 has a first end portion 92 and a second end portion 94 with external threads 96 formed on the second end portion 94. The first end portion 92 extends upwardly through the aligned apertures 58 with a portion of the external threads 96 extending beyond the exterior of the elongated handle securing member 14. A hook structure is formed on the first end portion 92 and includes a downwardly extending segment 98 and an inwardly extending segment 100.

The internally threaded wing nut 20 is threadedly secured to the external threads 96 of the hook member 18 with a flat washer 102 interposed between the wing nut 18 and the exterior of the elongated handle securing member 14. As the wing nut 20 is progressively threaded onto the external threads 96 of the hook member 18, the hook member 18 is drawn upwardly through the aligned apertures 58 until the downwardly extending segment 98 and the inwardly extending segment 100 of the hook member 18 securely engage the side 32 and the bottom 28 of the back 22 of the brush 24, respectively. It will be seen that when the wing nut 20 is drawn tightly down against the washer 102 and the handle securing member 14, the top 26 of the back 22 of the brush 24 is brought to secure abutting engagement with the second end face 54 of the handle securing member 14.

It should be clearly understood that when it is desired to remove and replace a brush 24 or the like from engagement with the apparatus 10, the thumb screw 20 is threadedly disengaged from the external threads 96 of the hook member 18 and the hook member 18 is removed from the apertures 58 in the elongated handle securing member 14. The old brush 24 may then be readily removed from engagement with the second end face 54 of the member 14 and a new brush or the like substituted therefor and secured to the second end face 54 of the member 14 by engaging the bottom 28 and the side 30 of the back 22 of the brush 24 with the U-shaped brush engaging member 16 and reinstalling the rigid hook member 18 as described above with the inwardly extending segment 100 and the downwardly extending segment 98 engaging the bottom 28 and the side 32 of the back 22 of the brush 24 and resecuring the wing nut 20 and washer 102 to the external threads 96 of the hook member 18.

Changes may be made in the combination and arrangement of parts or elements as heretofore set forth in the specification and shown in the drawing without departing from the spirit and scope of the invention as defined in the following claims.

What is claimed is:

1. An apparatus for securing one end of a handle to the back of a brush or the like having opposite sides, comprising:

a tubular member having a first end and a second end with a first end face on the first end and with a second end face on the second end lying in a plane oblique to the longitudinal axis of the tubular member, a first pair of aligned apertures formed in the tubular member the first pair of apertures being aligned along a line normal to the longitudinal axis of the tubular member and lying in a plane parallel to the plane of the second end face, a second pair of aligned apertures formed in the tubular member intermediate the first pair of aligned apertures and the second end face, the second pair of apertures being aligned along a line normal to the longitudinal axis of the tubular member;

a U-shaped member journaled at the medial portion thereof in the first pair of apertures in the tubular member and having hook means formed on each of the ends of the U-shaped member for engaging one side of the back of a brush;

a hook member having a first end and a second end with hook means formed on the first end for engaging the opposite side of the back of the brush and with external threads formed on the second end, the second end of the hook member extending through the second pair of aligned apertures;

internally threaded nut means for threadedly engaging the external threads of the second end of the hook member for drawing the hook means of the hook member and the hook means of the U-shaped member into secure engagement with the back of the brush to securely mutually engage the second end face of the tubular member with the back of the brush; and means for fixedly securing one end of the handle to the first end of the tubular member.

2. A handle assembly alternately securable to and releasable from a brush or the like of the type having a back with a substantially flat top, a bottom and opposite sides, with bristles or the like extending from the bottom thereof, comprising:

an elongated handle having first and second ends;

an elongated member having first and second ends with a first end face formed on the first end and a second end face formed on the second end and lying in a plane oblique to the longitudinal axis of said elongated member;

means for securing the second end of said elongated handle to the first end of said elongated member;

a first bore formed in said elongated member aligned along a line normal to the longitudinal axis of said elongated member and lying in a plane parallel to the plane of the second end face of said elongated member;

a second bore formed in said member intermediate said first bore and the second end face thereof, said second bore being aligned along a line normal to the longitudinal axis of said elongated member;

a rigid U-shaped member journaled at the medial portion thereof in said first bore and having hook means formed on each of the opposite ends thereof for engaging one side and the bottom of the back of the brush;

a rigid hook member having a first end and a second end with hook means formed on the first end thereof for engaging the opposite side and the bottom of the back of the brush and with external threads formed on the second end thereof extending through said second bore;

internally threaded nut means for engaging the external threads of the second end of said rigid hook member for drawing the hook means thereof and the two hook means of said U-shaped member into secure engagement with the opposite sides and the bottom of the back of the brush and mutually engaging the second end face of said elongated member with the top of the back of the brush.

3. A handle assembly alternately securable to and releasable from a brush or the like of the type having a back with a top, bottom and opposite sides, with bristles or the like extending from the bottom thereof, comprising:

an elongated handle having first and second ends with a second end face formed on the second end and lying in a plane oblique to the longitudinal axis of said elongated handle;

a first bore formed in said elongated handle aligned along a line normal to the longitudinal axis of said elongated handle and lying in a plane parallel to the plane of the second end face thereof;

a second bore formed in said elongated handle intermediate said first bore and the second end face thereof, said second bore being aligned along a line normal to the longitudinal axis of said elongated handle;

a rigid U-shaped member journaled at the medial portion thereof in said first bore and having hook means formed on each of the opposite ends thereof for engaging one side and the bottom of the back of the brush;

a rigid hook member having a first end and a second end with hook means formed on the first end thereof for engaging the opposite side and the bottom of the back of the brush and with external threads formed on the second end thereof extending through said second bore; and internally threaded nut means for engaging the external threads of the second end of said rigid hook member for drawing the hook means thereof and the two hook means of said U-shaped member into secure engagement with the opposite sides and bottom of the back of the brush and mutually engaging the second end face of said elongated handle with the top of the back of the brush.

4. A handle assembly alternately securable to and releasable from a brush or the like of the type having a back with a top, bottom and opposite sides, with bristles or the like extending from the bottom thereof, comprising:

an elongated handle having first and second ends;

an elongated member having first and second ends with a first end face formed on the first end and a second end face formed on the second end and with the second end face lying in a plane oblique to the longitudinal axis of said elongated member;

means for securing the second end of said elongated handle to the first end of said elongated member;

a first bore formed in said elongated member aligned along a line normal to the longitudinal axis of said elongated member and lying in a plane parallel to the plane of the second end face of said elongated member;

a second bore formed in said elongated member intermediate said first bore and the second end face thereof, said second bore being aligned along a line normal to the longitudinal axis of said elongated member;

a rigid U-shaped member journaled at the medial portion thereof in siad first bore and having hook means formed on each of the opposite ends thereof for engaging one side and the bottom of the back of the brush;

a rigid hook member having a first end and a second end with hook means formed on the first end thereof for engaging the opposite side and the bottom of the back of the brush and with external threads formed on the second end thereof extending through said second bore;

internally threaded nut means for engaging the external threads of the second end of said rigid hook member for drawing the hook means thereof and the two hook means of said U-shaped member into secure engagement with the opposite sides and bottom of the back of the brush and mutually engaging the second end face of said elongated handle with the top of the back of the brush.

5. The handle assembly as defined in claim 4 wherein said means for securing the second end of said elongated handle to the first end of said elongated member is characterized further to include:

an externally threaded portion formed on the second end of said elongated handle;

a cylindrical inner periphery formed within said elongated member communicating with the first end face thereof;

means disposed within said cylindrical inner periphery for threadedly receiving the external threads of said elongated handle within the first end of said elongated member to fixedly secure said elongated handle to said elongated member; and means mutually engaging the externally threaded portion of said elongated handle and the first end of said elongated member for maintaining secure threaded engagement therebetween.

6. The handle assembly as defined in claim 5 wherein said means for threadedly receiving the externally threaded portion of said elongated handle is characterized further to include:

a cylindrically shaped length of resilient tubing slidingly disposed within the cylindrical inner periphery of said elongated member having a cylindrical inner surface of a diameter less than the major diameter of the externally threaded portion of said elongated handle.

7. The handle assembly as defined in claim 6 wherein said cylindrically shaped resilient tubular member is formed of vinyl tubing.

* * * * *